April 9, 1940.  E. F. LOWEKE  2,196,930
FLUID PRESSURE SYSTEM
Filed Dec. 3, 1937  2 Sheets-Sheet 1
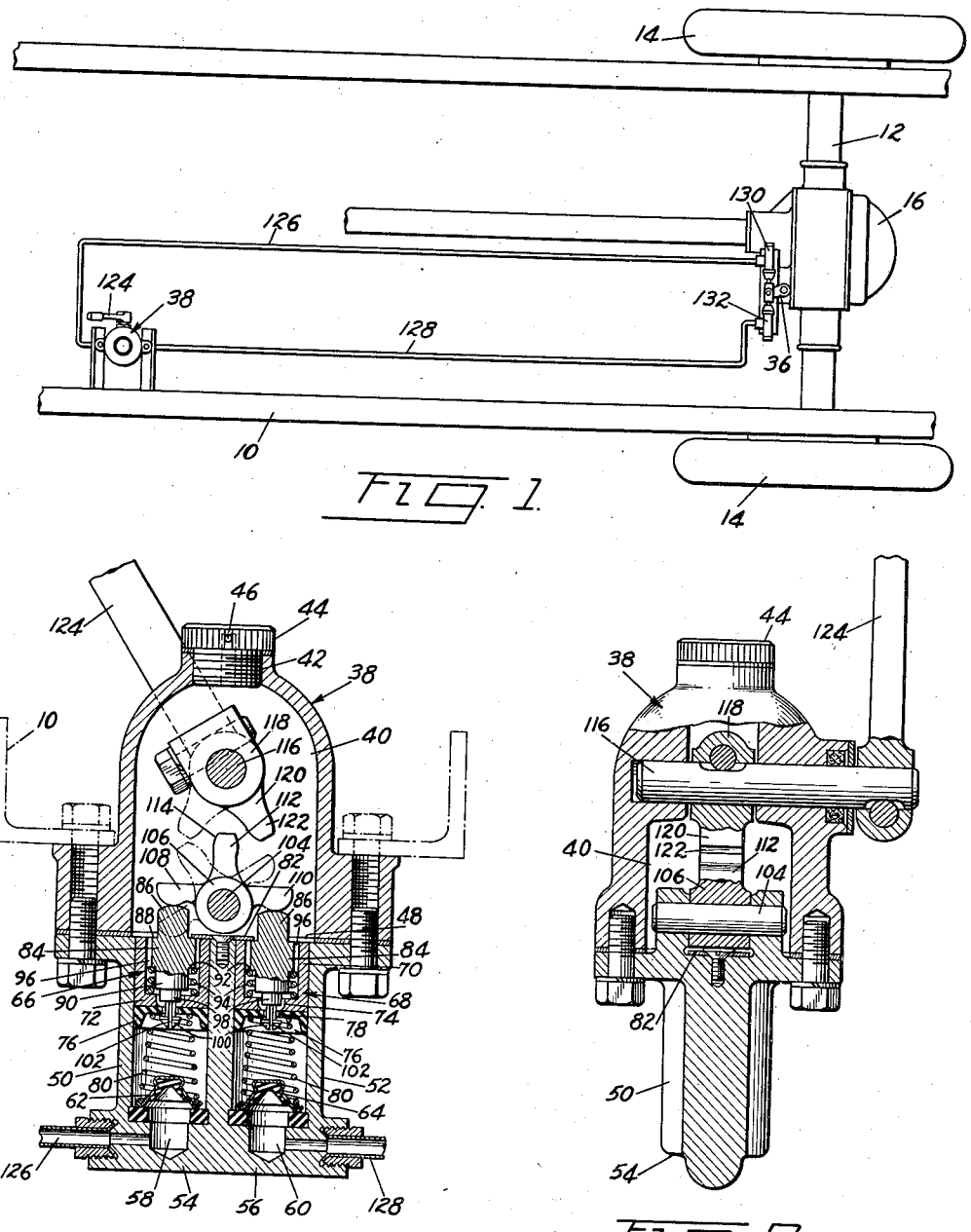
INVENTOR.
ERWIN F. LOWEKE
BY
ATTORNEY.

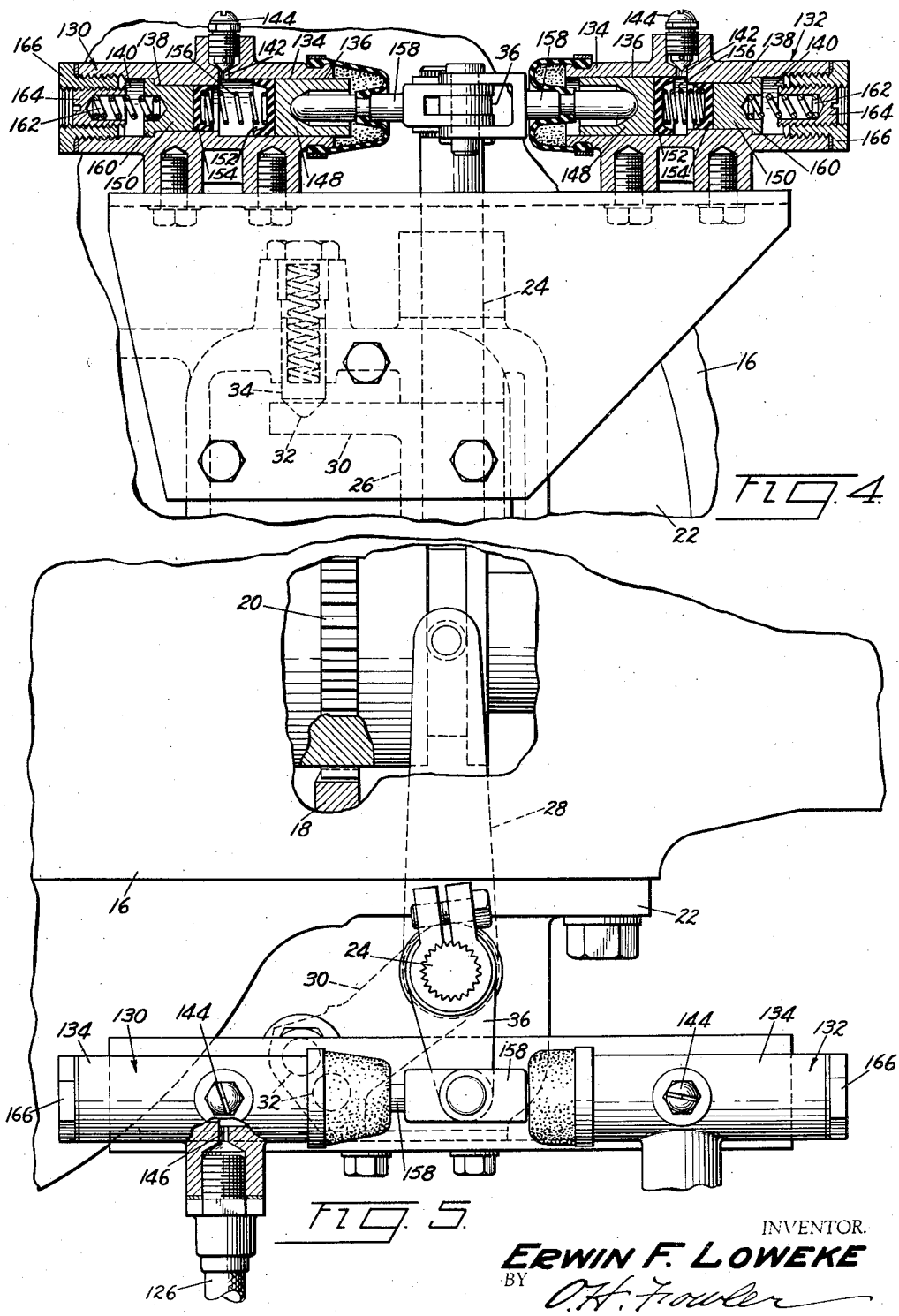

Patented Apr. 9, 1940

2,196,930

UNITED STATES PATENT OFFICE 2,196,930

FLUID PRESSURE SYSTEM

Erwin F. Loweke, Detroit, Mich., assignor to Hydraulic Brake Company, Detroit, Mich., a corporation of California Application December 3, 1937, Serial No. 178,000

7 Claims. (Cl. 60—54.5)

This invention relates to fluid pressure systems.

An object of the invention is to provide a fluid pressure system for energizing a remote fluid pressure actuated motor.

Another object of the invention is a duplex fluid pressure producing device having a single actuator operative to successively actuate the fluid pressure producing devices.

Another object of the invention is to provide a fluid pressure system including a duplex fluid pressure producing device, operative successively, and opposed fluid pressure motors connected thereto having connected therebetween a shiftable element.

Other objects and advantages of the invention will appear from the following description taken in connection with the drawings forming a part of this specification, and in which—

Fig. 1 is a top plan view of a motor vehicle chassis partly broken away illustrating the invention as applied;

Fig. 2 is a vertical sectional view of the fluid pressure producing device;

Fig. 3 is a sectional view substantially on line 3—3, Fig. 2;

Fig. 4 is a top plan view of the shifting mechanism and fluid pressure motors for actuating the shifting mechanism, the motors being shown in section; and Fig. 5 is a top plan view of a two-speed axle, partly broken away, the shifting mechanism, and the motors.

Referring to the drawings for more specific details of the invention, 10 represents a motor vehicle chassis frame supported on springs, not shown, generally suspended from a front axle, also not shown, and a rear axle 12 having suitably mounted thereon for rotation wheels 14 of conventional type. The axle 12 has connected therein a differential 16, and associated with the differential is a two-speed transmission 18 including a shiftable gear 20.

A casing 22 secured to the housing of the differential has mounted therein for oscillation a shaft 24 extending through and beyond the casing, and a sleeve 26 keyed on the shaft within the casing carries a fork 28 embracing the shiftable gear 20. The sleeve 26 also carries a lever 30 having adjacent its free end spaced recesses 32 for the reception of a spring-pressed plunger 34 mounted on the wall of the casing for yieldingly retaining the lever against movement, and suitably secured to the shaft outside of the casing is an operating lever 36.

A fluid pressure producing device, indicated generally at 38, is suitably mounted on the frame 10 of the vehicle chassis. This fluid pressure producing device includes a reservoir 40 provided with a filling opening 42 normally closed as by a plug 44 having openings 46 therethrough for venting the reservoir to the atmosphere. The reservoir is open at its bottom as indicated at 48, and depending from the bottom are corresponding parallel cylinders 50 and 52 opening into the reservoir. The cylinders have heads 54 and 56 provided with discharge ports 58 and 60 controlled as by two-way valves 62 and 64 seated on the heads.

A pair of corresponding pistons 66 and 68 reciprocable in the cylinders 50 and 52 each include a shell 70 open at one of its ends and closed at its other end. The closed end of the shell provides a head 72 having a port 74 providing a communication between the interior of the shell and that portion of the cylinder forward of the piston. A sealing cup 76 seated on the head has an axial opening 78, and the perimeter defining this opening overhangs the port 72, the object of which will hereinafter appear. A spring 80, interposed between the cup 76 and the valve controlling the discharge port, serves to retain the cup and the valve against displacement and also to return the piston to its retracted position against a stop 82 secured to the partition between the cylinders.

A plunger 84 reciprocable in the shell 70 has one of its ends 86 reduced in cross-section so as to provide an annular shoulder 88 adapted to seat on the stop 82 when the plunger is in retracted position. The other end 90 of the plunger is also reduced in cross-section so as to provide an annular shoulder 92, and sleeved on this end of the plunger between the annular shoulder 92 and the back of the head 72 of the shell is a spring 94 normally urging the plunger to its retracted position.

The plunger also has a plurality of spaced passages 96 therethrough, providing communications between the reservoir and the port in the head of the shell, and a concentric extension 98 on its reduced end 90 adapted to enter and close the port in the head of the shell and also to engage the overhanging perimeter of the cup defining the opening therein so as to effectively seal the port.

The extension 98 has thereon a concentric pin 100 extending through the port in the head 72 and the opening in the sealing cup 76 with substantial clearance. The pin has a head of greater diameter than the port, and the pin is slotted as indicated at 102. This pin serves to retain the plunger against displacement, and the slots in the pin provide for the passage of fluid through the port in the head of the shell past the pin.

A shaft 104 mounted transversely within the reservoir adjacent the open end of the cylinders 50 and 52 has mounted thereon a rockable member or walking beam 106 including oppositely disposed arms 108 and 110 engaging the plunger 88 of the respective pistons 66 and 68. The walking beam 106 also includes an arm 112 arranged centrally between the arms 108 and 110, and on the free end of this arm 112 is a tooth 114.

A shaft 116 mounted transversely of the reservoir above the shaft 104 and parallel thereto has suitably secured thereon within the reservoir a sleeve 118 supporting an actuator 120 having upon its free end a tooth 122 arranged for cooperation with a tooth 114 on the arm 112, and suitably secured to the shaft 116 outside of the reservoir is an operating lever 124.

Fluid pressure delivery pipes or conduits 126 and 128 connect the discharge ports 58 and 60 of the cylinders 50 and 52 to fluid pressure actuated motors 130 and 132 for actuating the operating lever 36 of the transmission 18. The motors are suitably supported in a fixed position in oppositely disposed relation to one another.

Each of the motors 130 and 132 includes a cylinder 134 having communicating chambers 136, 138 and 140. The chambers 136 and 140 are of substantially the same diameter, and the chamber 138 has a somewhat smaller diameter. The cylinder has a port 142 at the junction of the chambers 136 and 138, controlled as by a bleeder screw 144, and an intake port 146.

Opposed pistons 148 and 150 are mounted for reciprocation in the cylinders 136 and 138, and sealing cups 152 and 154 seated on the heads of the pistons are held against displacement by a spring 156 interposed between the cups. The piston 148 has in its back a recess for the reception of a thrust pin 158 suitably connected to the lever 36, and the piston 150 has on its back a flange 160 normally seated on the annular shoulder at the junction of the large and small chambers; and in the back of the piston 150 is a recess receiving one end of a spring 162, the other end of which is seated in a recess in an adjustable screw 164 mounted for travel in a plug 166 threaded in the open end of the chamber 140.

In a normal operation, upon movement of the operating lever 124, the tooth 122 thereon engages the tooth 114 on the arm 112 of the walking beam 106, and transmits force thereto. This results in rocking the walking beam 106 and the transmission of force through the arm 108 thereof to the plunger 84 of the piston 66, resulting in advancing the plunger 84 against the resistance of the spring 94. During the initial movement of the plunger, the extension 98 thereon enters and closes the port 74 in the head of the piston 66, and thereafter the plunger and piston move as a single unit. As the piston advances on its compression stroke, the fluid in the cylinder forward of the piston is displaced therefrom, past the two-way valve 62, through the discharge port 58 and the conduit 126, into the fluid pressure actuated motor 130, causing energization of the motor. This results in movement of the lever 36 accompanied by rocking of the shaft 24, and this movement of the shaft 24 is transmitted therefrom through the fork 28 to the gear 20, resulting in shifting the transmission to the low speed position.

During this operation there is relative movement between the tooth 122 on the actuator 120 and the tooth 114 on the arm 112 of the walking beam 106. At the end of the stroke of the piston 66, the tooth 122 overrides the tooth 114, whereupon the walking beam 106 is returned to its normal position under the influence of the springs 94 urging the plungers 84 of the pistons 66 and 68 to their retracted positions.

Also, during this operation the quantity of fluid displaced from the cylinder and received by the motor 130 may be in excess of the quantity necessary to effectively actuate the transmission. This would impose undue strain on the mechanism and also inhibit tripping of the actuator due to the locking of the tooth 122 on the actuator with the tooth 114 on the arm 112 of the walking beam 106. Accordingly, to avoid this condition, the motor 130 is provided with a reciprocable piston 150 normally held on its seat by a spring 162 having sufficient tension to resist the pressure in the chamber 136 of the motor until adequate pressure has been attained to effectively shift the transmission, and thereafter to yield sufficiently to provide for a complete movement of the operating lever 124.

In shifting the transmission from the low speed position to the high speed position, the operating lever 124 is moved from its forward position backwardly. This movement of the operating lever 124 again engages the tooth 122 on the actuator with the tooth 114 on the walking beam 106, resulting in rocking the walking beam and the transmission of force therefrom through the arm 110 to the plunger 84 in the piston 60, causing actuation of the plunger.

During the initial movement of the plunger the extension 98 thereon enters and closes the port 74, and thereafter the plunger and the piston 68 move as a single unit; and as the piston advances on its compression stroke the fluid in the cylinder 52 forward of the piston 68 is displaced therefrom past the two-way valve 64 through the discharge port 60 and the fluid pressure delivery pipe 128 into the fluid pressure actuated motor 132, resulting in energization of the motor. This energization of the motor 132 results in movement of the lever 36 through an angle. This movement of the lever 36 results in rocking the shaft 24 keyed to the lever, and this movement of the shaft is transmitted through the fork 28, keyed thereto, to the gear 20, resulting in movement of the gear and thereby shifting the transmission to the high speed position—thus completing the cycle.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a pair of cylinders, a piston reciprocable in each cylinder, a walking beam having its oppositely disposed arms engaging the pistons, a centrally disposed arm on the walking beam, and an actuator having an overrunning tripping engagement with the free end of the centrally disposed arm.

2. A fluid pressure producing device comprising a pair of cylinders, a piston reciprocable in each cylinder, a walking beam having its oppositely disposed arms engaging the pistons, an arm centrally disposed on the walking beam, a tooth on the free end of the centrally disposed arm and an operating lever having a tooth on its force transmitting end adapted to ride over the tooth on the centrally disposed arm in both forward and reverse movement.

3. A fluid pressure producing device comprising a pair of parallel cylinders, a piston reciprocable in each cylinder, a walking beam having its oppositely disposed arms normally engaging the pistons, a centrally disposed upwardly extending arm on the walking beam having a tooth on its free end, and an actuator having a tooth on the force-transmitting end adapted to trippingly engage the tooth on the upwardly extending arm.

4. A fluid pressure producing device comprising a pair of parallel cylinders, a piston reciprocable in each cylinder, a walking beam mounted between the pistons for selective actuation thereof, a centrally disposed upwardly extending arm on the walking beam having a tooth on its free end, and an actuator, having a tooth thereon adapted to engage the tooth on the centrally disposed arm in both forward and reverse movement and to trip after a predetermined movement in either direction.

5. A fluid pressure producing device comprising a reservoir, a pair of cylinders depending therefrom and communicating therewith, a piston reciprocable in each cylinder having means effective for by-passing fluid when not on its compression stroke, a walking beam mounted between the pistons having its oppositely disposed arms normally engaging the pistons, a centrally disposed upwardly extending arm on the walking beam, a tooth on the free end of the upwardly extended arm, an actuator rockably mounted in the reservoir above the walking beam, a tooth on the actuator cooperating with the tooth on the upwardly extended arm, and means for rocking the actuator.

6. A fluid pressure system comprising a duplex fluid pressure producing device including a reservoir, a pair of cylinders depending therefrom and communicating therewith, a piston reciprocable in each of the cylinders having means effective for by-passing fluid when not on its compression stroke, a walking beam mounted between the pistons having its oppositely disposed arms in engagement therewith, a centrally disposed upwardly extending arm on the walking beam having a tooth on its free end, an actuator having a tooth adapted to engage and ride over the tooth on the centrally disposed arm, a fluid pressure actuated motor connected to each cylinder, and a shiftable element connected between the motors.

7. A fluid pressure system comprising a duplex fluid pressure producing device including a reservoir, a pair of cylinders depending therefrom and communicating therewith, a fluid pressure actuated motor connected to each of the cylinders, a shiftable element connected to the motors, a piston reciprocable in each of the cylinders having means effective for by-passing fluid when at rest and on its retraction stroke, a walking beam in the reservoir having its respective ends engaging the pistons for selective actuation thereof, a centrally disposed upwardly extending arm on the walking beam, and an actuator adapted to engage the centrally disposed arm in both forward and reverse movement and to trip over the arm after a predetermined movement in either direction so as to release the pressure in the system.

ERWIN F. LOWEKE.